US012649811B2

(12) United States Patent
Spilker

(10) Patent No.: US 12,649,811 B2
(45) Date of Patent: *Jun. 9, 2026

(54) SYNTHESIS OF ISOPRENE-BUTADIENE COPOLYMER RUBBERS

(71) Applicant: G-3 Chickadee Purchaser, LLC, Akron, OH (US)

(72) Inventor: Thomas Franklin Spilker, Broadview Heights, OH (US)

(73) Assignee: G-3 CHICKADEE PURCHASER, LLC, Akron, OH (US)

( * ) Notice: Subject to any disclaimer, the term of this patent is extended or adjusted under 35 U.S.C. 154(b) by 594 days.

This patent is subject to a terminal disclaimer.

(21) Appl. No.: 18/178,122

(22) Filed: Mar. 3, 2023

(65) Prior Publication Data

US 2023/0250208 A1 Aug. 10, 2023

Related U.S. Application Data

(63) Continuation-in-part of application No. 17/123,391, filed on Dec. 16, 2020, now Pat. No. 11,597,790.

(60) Provisional application No. 62/951,197, filed on Dec. 20, 2019.

(51) Int. Cl.

| | |
|---|---|
| ***C08F 236/08*** | (2006.01) |
| ***C08F 2/10*** | (2006.01) |
| ***C08F 4/54*** | (2006.01) |
| ***C08F 236/06*** | (2006.01) |

(52) U.S. Cl.

CPC .............. *C08F 236/06* (2013.01); *C08F 2/10* (2013.01); *C08F 4/545* (2013.01); *C08F 236/08* (2013.01)

(58) Field of Classification Search

None

See application file for complete search history.

(56) References Cited

U.S. PATENT DOCUMENTS

| | | | |
|---|---|---|---|
| 3,297,667 | A | 1/1967 | Van Dohlen et al. |
| 3,676,441 | A | 7/1972 | Nikles |
| 3,794,604 | A | 2/1974 | Throckmorton et al. |
| 4,242,232 | A | 12/1980 | Sylvester et al. |
| 4,260,707 | A | 4/1981 | Sylvester et al. |
| 4,429,089 | A | 1/1984 | Pedretti et al. |
| 4,444,903 | A | 4/1984 | Carbonaro et al. |
| 4,461,883 | A | 7/1984 | Takeuchi et al. |
| 4,533,711 | A | 8/1985 | Takeuchi et al. |
| 4,663,405 | A | 5/1987 | Throckomorton |
| 5,405,815 | A | 4/1995 | Bell et al. |
| 5,502,126 | A | 3/1996 | Bell et al. |
| 5,659,101 | A | 8/1997 | Biagnini et al. |
| 5,686,371 | A | 11/1997 | Ansell et al. |
| 6,136,931 | A | 10/2000 | Jang et al. |
| 6,255,416 | B1 | 7/2001 | Nonaka et al. |
| 6,437,205 | B1 | 8/2002 | Miller et al. |
| 6,780,948 | B2 | 8/2004 | Rachita et al. |
| 7,115,693 | B2 | 10/2006 | Laubry |
| 7,153,805 | B2 | 12/2006 | Hsu et al. |
| 11,597,790 | B2 * | 3/2023 | Spilker ................ C08F 236/08 |
| 2003/0125487 | A1 | 7/2003 | Hsu et al. |
| 2003/0187162 | A1 | 10/2003 | Rachita et al. |
| 2004/0186252 | A1 | 9/2004 | Hsu et al. |
| 2014/0350202 | A1 | 11/2014 | Thuilliez et al. |
| 2014/0364573 | A1 | 12/2014 | Kloppenburg et al. |
| 2015/0166707 | A1 | 6/2015 | Lee et al. |
| 2016/0264698 | A1 | 9/2016 | Qin et al. |
| 2018/0009918 | A1 | 1/2018 | Dickstein et al. |

FOREIGN PATENT DOCUMENTS

| | | | | |
|---|---|---|---|---|
| EP | 2650313 | A1 * | 10/2013 | .............. C08F 36/04 |
| EP | 3444125 | A1 | 2/2019 | |
| JP | 57087406 | A * | 5/1982 | |

OTHER PUBLICATIONS

Japanese Official Office Action /Decision of Rejection dated Feb. 21, 2025 (with English Translation).

Extended European Search Report dated May 25, 2021 for EP Patent Application No. 20214360.8 which is the European counterpart to the subject patent application.

* cited by examiner

*Primary Examiner* — Richard A. Huhn

(74) *Attorney, Agent, or Firm* — Jackson Walker LLP; Leisa Talbert Peschel

(57) ABSTRACT

It has been unexpectedly found that certain neodymium catalyst systems can be used to copolymerize isoprene and 1,3-butadiene to produce random isoprene-butadiene copolymer rubbers which are not tapered. These random isoprene-butadiene copolymer rubbers have properties which are beneficial for use in rubber formulations for manufacturing a wide variety of rubber products, such as tires, hoses, conveyor belts, power transmission belts, and shoe soles. These random isoprene-butadiene rubbers are synthesized by copolymerizing (a) isoprene monomer or a substituted isoprene monomer and (b) 1,3-butadiene monomer in the presence of a neodymium catalyst system, wherein the neodymium catalyst system is prepared by (1) reacting a neodymium carboxylate with an organoaluminum compound in the presence of a conjugated diolefin monomer to produce neodymium-aluminum catalyst component, and (2) subsequently reacting the neodymium-aluminum catalyst component with an alkyl aluminum chloride to produce the neodymium catalyst system.

20 Claims, No Drawings

SYNTHESIS OF ISOPRENE-BUTADIENE COPOLYMER RUBBERS

This patent application is a continuation-in-part application of U.S. patent application Ser. No. 17/123,391, filed on Dec. 16, 2020, which claims benefit of U.S. Provisional Patent Application Ser. No. 62/951,197, filed on Dec. 20, 2019. The teachings of U.S. patent application Ser. No. 17/123,391 and U.S. Provisional Patent Application Ser. No. 62/951,197 are incorporated herein by reference in their entirety.

BACKGROUND OF THE INVENTION

It has been known for decades that neodymium salts which are activated with aluminum alkyl co-catalysts can be used to catalyze the polymerization of conjugated diene monomers. To date, many papers and patents have been published which describe variations and improvements to the original systems (see U.S. Pat. Nos. 3,297,667, 3,676,441, and 3,794,604). Much of this work was driven by the eventual commercialization of high cis-polybutadiene in the 1980s for the use in tire applications (see U.S. Pat. Nos. 4,242,232, 4,260,707, 4,699,960, and 4,444,903).

The type of catalyst system employed and the method of its preparation are essential to the success of the polymerization. Traditionally, there are two main types of catalyst systems, the first is a ternary system based on soluble neodymium carboxylates in conjunction with an alkylaluminum co-catalyst and a halogen source (see R. P. Quirk, A. M. Kells, K. Yunlu, J.-P. Cuif, *Polymer* 41, 5903 (2000) and A. Pross, P. Marquardt, K. H. Reichert, W. Nentwig, T. Knauf, *Angew. Makromol. Chem.* 211, 89 (1993)). The second system is a binary catalyst comprising of an insoluble neodymium halide complexed with three equivalence of a Lewis base such as an alcohol, amine, or phosphonate and an alkylaluminum activator (see H. Iovu, G. Hubca, E. Simionescu, E. Badea, J. S. Hurst, *Eur. Polymer J.* 33, 811 (1997); H. Iovu, G. Hubca, D. Racoti, J. S. Hurst, *Eur. Polymer J.* 35, 335 (1999); and J. H. Yang, M. Tsutsui, Z. Chen, D. Bergbreiter, *Macromolecules* 15, 230 (1982)).

In general, the two systems exhibit similar behavior; however, the ternary system appears to have gained acceptance commercially in the production of polybutadiene (see D. J. Wilson, *J. Polym. Sci., Part A.* 33, 2505 (1995)). Typically, the most active ternary systems consist of treating a branched long chain neodymium carboxylate with branched trialkyl-aluminum or dialkylaluminum hydrides, in an Al/Nd ratio between 10-40/1, and the use of 2-3 equivalents of a halide source, such as diethylaluminum chloride or tert-butylchloride.

The active catalyst is typically prepared in one of two ways. The simplest method is to generate the catalyst in-situ by sequentially introducing the catalyst components to the polymerization solution. It is usually most effective to introduce the aluminum alkyl components first, thereby scavenging impurities from the premix prior to contact with the neodymium salt. The other method for catalyst preparation is to preform the catalyst components prior to introducing them into the polymerization vessel. The most common practice involves sequentially treating the catalyst components in the presence of at least a few equivalents of monomer followed by an aging period. For example U.S. Pat. No. 3,794,604 discloses an improved preforming technique which is carried out in the presence of a small portion of a conjugated diene.

Aging the catalyst components with a diene prior to polymerization results in a more active catalyst then when the conjugated diene is absent. The disclosed technique for catalyst formation is to age after all of the components have been mixed together. U.S. Pat. No. 4,429,089 also teaches the use of a diolefin during catalyst formation and states that the particular procedure which is followed has no bearing on the polymerization run. Likewise, U.S. Pat. No. 4,461,883 discloses that the use of a conjugated diene in the catalyst make-up is preferable for improving the activity of the catalyst. In this example, the diene is mixed with the catalyst components at any time in the preforming step with aging occurring after all components are mixed together.

U.S. Pat. No. 4,533,711 teaches the practice of adding the catalyst components together first followed by the addition of a small amount of diene and then aging the preformed catalyst. This patent states that the diene is not essential in the make-up but it does serve to increase catalyst activity. U.S. Pat. No. 4,663,405 continues to teach the use of conjugated dienes as components in preformed catalysts. It goes on to state that soluble catalysts result when diolefins are present in the make-up while insoluble catalysts frequently result when no diene is present. This patent teaches a process where aging of the catalyst occurs after the reagents are added.

U.S. Pat. No. 5,502,126 again practices the use of a diene in the preformed catalyst make-up and again states that it is preferred to age the catalyst after the labile halogen compound is added. In U.S. Pat. No. 5,659,101 the use of a diolefin in conjunction with a boron derived halogen source results in a preformed catalyst that partially forms a solid precipitate in aliphatic solvents.

When silicone halides are used, as in U.S. Pat. No. 5,686,371, aging in the presence of a diene again is performed after the addition of all the catalyst components. U.S. Pat. No. 6,136,931 discloses an improved boron halide dependent preformed catalyst that has excellent solubility in non-polar solvents. Finally, U.S. Pat. No. 6,255,416 also practice preformed catalyst generation in the presence of a small amount of diene. Aging in this case again occurs after all of the catalyst components are mixed.

U.S. Pat. No. 4,663,405 discloses that conjugated diolefin monomers can be polymerized with a catalyst system which is comprised of (1) an organoaluminum compound, (2) an organometallic compound which contains a metal from Group III-B of the Periodic System, such as lanthanides and actinides, and (3) at least one compound which contains at least one labile halogen atom. U.S. Pat. No. 4,663,405 also discloses that the molecular weight of the polymers made with such catalyst systems can be reduced by conducting the polymerization in the presence of a vinyl halide. However, its teachings do not specifically disclose copolymerizations of isoprene with butadiene and do not provide any technique for making the isoprene monomer polymerize at a rate that is similar to that of the butadiene monomer. Thus, its teachings do not provide a technique for synthesizing random, non-tapered isoprene-butadiene rubbers with catalyst systems which are comprised of (1) an organoaluminum compound, (2) an organometallic compound which contains a metal from Group III-B of the Periodic System, such as lanthanides and actinides, and (3) at least one compound which contains at least one labile halogen atom.

The technological advantage of a completely soluble preformed catalyst has previously been appreciated. As U.S. Pat. No. 4,461,883 teaches, a heterogeneous system is a disadvantage in an industrial setting. Likewise, U.S. Pat. No. 6,136,931 states that the use of heterogeneous catalyst systems containing suspended particles usually produces gel. This patent also states a heterogeneous system, compared to a homogenous one, is more difficult to control the exact amount of catalyst added during the polymerization. Similarly, we have found that catalyst prepared without the first aging period results in a catalyst suspension of a fine precipitate. This suspension settles upon standing into two phases. If the resulting supernate, or top layer, is used to polymerize a conjugated diene, extremely inefficient catalyst activity results. Catalyst activity can be restored in these systems only after agitation of the by-phasic mixtures. This allows for the introduction of a heterogeneous catalyst suspension to the monomer to be polymerized. However, it is now possible to ensure consistent and highly active soluble preformed catalyst formation by utilizing the appropriate two step aging technique. This is of obvious technological advantage, since there would be no need to use a stirred tank catalyst storage tank or other engineering constraints to ensure consistent catalyst suspensions.

U.S. Pat. No. 5,405,815 discloses a process or preparing a catalyst system which is particularly useful for copolymerizing isoprene and 1,3-butadiene monomers into rubbers which comprises the sequential steps of (1) mixing (a) an organoaluminum hydride, (b) a member selected from the group consisting of aliphatic alcohols, cycloaliphatic alcohols, aliphatic thiols, cycloaliphatic thiols, trialkyl silanols, and triaryl silanols, and (c) optionally, 1,3-butadiene in an organic solvent to produce a modified organoaluminum catalyst component; (2) adding an organometallic compound which contains a metal from Group III-B of the Periodic System to the modified organoaluminum catalyst component to produce a Group III-B metal containing catalyst component; (3) adding a compound which contains at least one labile halogen atom to the Group III-B metal containing catalyst component; and (4) aging the catalyst system after the compound which contains at least one labile halogen atom is added to the modified Group III-B metal containing catalyst component for a period of 10 minutes to 6 hours, wherein the catalyst system is aged at a temperature which is within the range of about 30° C. to about 85° C.

U.S. Pat. No. 6,780,948 discloses a process for the synthesis of polyisoprene rubber which comprises polymerizing isoprene monomer in the presence of a neodymium catalyst system, wherein the neodymium catalyst system is prepared by (1) reacting a neodymium carboxylate with an organoaluminum compound in the presence of isoprene for a period of about 10 minutes to about 30 minutes to produce neodymium-aluminum catalyst component, and (2) subsequently reacting the neodymium-aluminum catalyst component with a dialkyl aluminum chloride for a period of at least 30 minutes to produce the neodymium catalyst system.

In the copolymerization of 1,3-butadiene and isoprene with unmodified neodymium catalysts, the 1,3-butadiene polymerizes about 19 times faster than the isoprene. For this reason, such copolymers do not have a random distribution of monomers. One end of the polymer chains contain mostly repeat units which are derived from butadiene (which polymerized faster) and the other end of the polymer chains contain mostly repeat units which are derived from isoprene (which polymerized slower). As the polymerization proceeds, the availability of butadiene monomer for polymerization diminishes leaving more and more isoprene to polymerize subsequently. This causes such isoprene-butadiene rubbers to be tapered.

SUMMARY OF THE INVENTION

It has been unexpectedly found that the neodymium catalyst systems of this invention can be used in the copolymerization of isoprene (or substituted isoprene monomers) and 1,3-butadiene. It has been further found that the use of these catalyst systems results in equal rates of isoprene and 1,3-butadiene polymerization. This results in the production of random copolymer rubbers which are not tapered. These random isoprene-butadiene copolymer rubbers have properties which are beneficial for use in rubber formulations for manufacturing a wide variety of rubber products, such as tires, hoses, conveyor belts, power transmission belts, air springs, shoe soles, windshield wiper blades, and the like.

This invention more specifically discloses a process for the synthesis of an isoprene-butadiene rubber which comprises copolymerizing (a) isoprene monomer or a substituted isoprene monomer and (b) 1,3-butadiene monomer in the presence of a neodymium catalyst system, wherein the neodymium catalyst system is prepared by (1) reacting a neodymium carboxylate with an organoaluminum compound in the presence of a conjugated diolefin monomer to produce neodymium-aluminum catalyst component, and (2) subsequently reacting the neodymium-aluminum catalyst component with an alkyl aluminum chloride to produce the neodymium catalyst system.

The present invention further reveals a process for the synthesis of an isoprene-butadiene rubber which comprises copolymerizing (a) isoprene monomer or a substituted isoprene monomer and (b) 1,3-butadiene monomer in the presence of a neodymium catalyst system, wherein the neodymium catalyst system is prepared by (1) reacting a neodymium carboxylate with an organoaluminum compound in the presence of a conjugated diolefin monomer to produce neodymium-aluminum catalyst component, and (2) subsequently reacting the neodymium-aluminum catalyst component with an alkyl aluminum chloride to produce the neodymium catalyst system, where from 40 weight percent to 70 weight percent isoprene is copolymerized with 30 weight percent to 60 weight percent 1,3-butadiene.

DETAILED DESCRIPTION OF THE INVENTION

The neodymium catalyst system of this invention can be used in the copolymerization of 1,3-butadiene and isoprene monomer or a substituted isoprene monomer into random isoprene-butadiene copolymer rubber that is clear and of high purity. This neodymium catalyst system can also be utilized in the copolymerization of substituted isoprene monomers with 1,3-butadiene to product other useful synthetic rubbers. In any case, such polymerizations are typically conducted in a hydrocarbon solvent that can be one or more aromatic, paraffinic, or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, normal hexane, benzene, toluene, xylene, ethylbenzene, and the like, alone or in admixture.

The substituted isoprene monomers than can be copolymerized with 1,3-butadiene utilizing the neodymium catalyst system of this invention can be of the general structural formula:

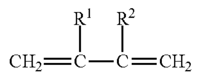

wherein $R^1$ represents an alkyl group containing from 1 to 12 carbon atoms or a phenyl group, and wherein $R^2$ represents an alkyl group containing from 1 to 12 carbon atoms, a phenyl group, or a hydrogen atom, and wherein $R^1$ and $R^2$ can be the same or different. For instance, $R^1$ can represent an alkyl group containing from 2 to 12 carbon atoms with $R^2$ being a hydrogen atom. Such substituted isoprene monomers include, but are not limited to, 2-ethyl-1,3-butadiene, 2-normal-propyl-1,3-butadiene, 2-isopropyl-1,3-butadiene, 2-normal-butyl-1,3-butadiene, 2-isobutyl-1,3-butadiene, 2-tert-butyl-1,3-butadiene, 2-pentyl-1,3-butadiene, 2-hexyl-1,3-butadiene, 2-heptyl-1,3-butadiene, 2-octyl-1,3-butadiene, 2-nonyl-1,3-butadiene, 2-decyl-1,3-butadiene, 2-undecyl-1,3-butadiene, and 2-dodecyl-1,3-butadiene. In other scenarios $R^1$ can be a phenyl group and $R^2$ can be a hydrogen atom wherein the monomer is 2-phenyl-1,3-butadiene or $R^1$ and $R^2$ can both represent phenyl groups wherein the monomer is 2,3-diphenyl-1,3-butadiene. In many cases, $R^1$ will represent an alkyl group containing from 2 to 8 carbon atoms or 2 to 4 carbon atoms and $R^2$ will represent a hydrogen atom. In another scenario $R^1$ and $R^2$ both represent alkyl groups containing from 2 to 8 carbon atoms or 2 to 4 carbon atoms, such as 2,3-dimethyl-1,3-butadiene. Additional substituted isoprene monomers than can be used include myrcene (7-methyl-3-methylene-octa-1,6 diene) and β-farnasene (3,7,11-trimethyl-1,3,6,10-dodecatetraene). Other terpenes of the structural formula:

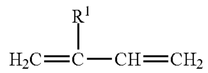

can also be utilized in the practice of this invention. It is also within the scope of this invention to synthesize random terpolymer rubbers by polymerizing a mixture of isoprene, a substituted isoprene monomer, and 1,3-butadiene monomer.

In solution polymerizations that utilize the catalyst systems of this invention, there will normally be from 5 to 35 weight percent total monomers in the polymerization medium. Such polymerization mediums are, of course, comprised of an organic solvent, the monomers (isoprene, substituted isoprene monomers, and 1,3-butadiene), and the neodymium catalyst system. In most cases, it will be preferred for the polymerization medium to contain from 10 to 30 weight percent monomers. It is generally more preferred for the polymerization medium to contain 12 to 18 weight percent monomers.

In the polymerizations of this invention normally from 30 weight percent to 70 weight percent isoprene is copolymerized with 30 weight percent to 70 weight percent 1,3-butadiene. More typically from 40 weight percent to 60 weight percent isoprene is copolymerized with 40 weight percent to 60 weight percent 1,3-butadiene. In some cases, 45 weight percent to 55 weight percent isoprene is copolymerized with 45 weight percent to 66 weight percent 1,3-butadiene. For instance, 30 weight percent to 60 percent 1,3-butadiene can be copolymerized with 40 percent to 70 percent isoprene. In other scenarios, from 45 weight percent to 55 weight percent isoprene can be copolymerized with 45 weight percent to 55 weight percent 1,3-butadiene, or 30 weight percent to 50 percent 1,3-butadiene can be copolymerized with 50 percent to 70 percent isoprene or from 60 weight percent to 70 weight percent isoprene can be copolymerized with 30 weight percent to 40 weight percent 1,3-butadiene.

The neodymium catalyst system used in the process of this invention is made by preforming three catalyst components. These components are (1) an organoaluminum compound, (2) a neodymium carboxylate, and (3) an alkyl aluminum chloride. In making the neodymium catalyst system the neodymium carboxylate and the organoaluminum compound are first reacted together in the presence of a conjugated diolefin monomer to produce a neodymium-aluminum catalyst component. The conjugated diolefin monomer can be isoprene, 1,3-butadiene, piperylene, 1,3-hexadiene, 1,3-heptadiene, 1,3-octadiene, 2,4-hexadiene, 2,4-heptadiene, 2,4-octadiene and 1,3-nonadiene, 2,3-dimethylbutadiene, 2,3-dimethyl-1,3-hexadiene, 2,3-dimethyl-1,3-heptadiene, 2,3-dimethyl-1,3-octadiene and 2,3-dimethyl-1,3-nonadiene and mixtures thereof.

The neodymium carboxylate and the organoaluminum compound are typically reacted for a period of at least 5 minutes and more typically for a period of at least 10 minutes. In most cases the neodymium carboxylate and the organoaluminum compound will be allowed to react together for a period which is within the range of 10 minutes to about 300 minutes. For instance, the neodymium carboxylate and the organoaluminum compound can be allowed to react together for a period which is within the range of 10 minutes to 60 minutes or which is within the range of 15 minutes to 30 minutes.

The neodymium-aluminum catalyst component is then reacted with the alkyl aluminum chloride to produce the neodymium catalyst system. This reaction was unexpectedly found to occur very rapidly and can be carried out in less than 20 minutes. To increase rates of productivity and to maximize equipment utilization this step can be completed within a period of less than 10 minutes. For instance, this step can be completed within a period of 1 minute to 5 minutes. It is also possible to allow the neodymium-aluminum catalyst component to react with the alkyl aluminum chloride for much longer periods, for instance up to 24 hours or even 48 hours, to produce the neodymium catalyst system before it is employed as the catalyst for the copolymerization of isoprene and 1.3-butadiene. However, aging the catalyst system for long periods of time does not result in any benefits even though doing so does not cause any detrimental results.

The neodymium catalyst system will typically be preformed at a temperature that is within the range of about −10° C. to about 60° C. The neodymium catalyst system will more typically be prepared at a temperature that is within the range of about 0° C. to about 30° C. The neodymium catalyst system will preferably be prepared at a temperature that is within the range of about 5° C. to about 15° C. The period of time needed for the catalyst to be preformed is increased by utilizing lower temperatures.

The alkyl aluminum chloride can be a dialkyl aluminum chloride wherein the alkyl group contains from 1 to about 12 carbon atoms. Such dialkyl aluminum chloride compounds will typically contain from 1 to 8 carbon atoms and will more typically contain from 1 to 4 carbon atoms. For instance, the dialkyl aluminum chloride can be diethyl aluminum chloride.

The organoaluminum compound contains at least one carbon to aluminum bond and can be represented by the structural formula:

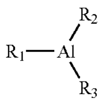

in which $R_1$ is selected from the group consisting of alkyl (including cycloalkyl), alkoxy, aryl, alkaryl, arylalkyl radicals and hydrogen: $R_2$ is selected from the group consisting of alkyl (including cycloalkyl), aryl, alkaryl, arylalkyl radicals and hydrogen and $R_3$ is selected from a group consisting of alkyl (including cycloalkyl), aryl, alkaryl and arylalkyl radicals. Representative of the compounds corresponding to this definition are: diethylaluminum hydride, di-n-propylaluminum hydride, di-n-butylaluminum hydride, diisobutylaluminum hydride, diphenylaluminum hydride, di-p-tolylaluminum hydride, dibenzylaluminum hydride, phenylethylaluminum hydride, phenyl-n-propylaluminum hydride, p-tolylethylaluminum hydride, p-tolyl-n-propylaluminum hydride, p-tolylisopropylaluminum hydride, benzylethylaluminum hydride, benzyl-n-propylaluminum hydride, and benzylisopropylaluminum hydride and other organoaluminum hydrides. Also included are ethylaluminum dihydride, butylaluminum dihydride, isobutylaluminum dihydride, octylaluminum dihydride, amylaluminum dihydride and other organoaluminum dihydrides. Also included are diethylaluminum ethoxide and dipropylaluminum ethoxide. Also included are trimethylaluminum, triethylaluminum, tri-n-propylaluminum, triisopropylaluminum, tri-n-propylaluminum, triisopropylaluminim, tri-n-butylaluminum, triisobutylaluminum, tripentylaluminum, trihexylaluminum, tricyclohexylaluminum, trioctylaluminum, triphenylaluminum, tri-p-tolylaluminum, tribenzylaluminum, ethyldiphenylaluminum, ethyl-di-p-tolylaluminum, ethyldibenzylaluminum, diethylphenylaluminum, diethyl-p-tolylaluminum, diethylbenzylaluminum and other triorganoaluminum compounds.

The neodymium carboxylate utilizes an organic monocarboxylic acid ligand that contains from 1 to 20 carbon atoms, such as acetic acid, propionic acid, valeric acid, hexanoic acid, 2-ethylhexanoic acid, neodecanoic acid, lauric acid, stearic acid and the like neodymium naphthenate, neodymium neodecanoate, neodymium octanoate, and other neodymium metal complexes with carboxylic acid containing ligands containing from 1 to 20 carbon atoms.

The proportions of the catalyst components utilized in making the neodymium catalyst system of this invention can be varied widely. The atomic ratio of the halide ion to the neodymium metal can vary from about 0.1/1 to about 6/1. A more preferred ratio is from about 0.5/1 to about 3.5/1 and the most preferred ratio is about 2/1. The molar ratio of the trialkylaluminum or alkylaluminum hydride to neodymium metal can range from about 4/1 to about 200/1 with the most preferred range being from about 8/1 to about 100/1. The molar ratio of isoprene to neodymium metal can range from about 0.2/1 to 3000/1 with the most preferred range being from about 5/1 to about 500/1.

The amount of catalyst used to initiate the polymerization can be varied over a wide range. Low concentrations of the catalyst system are normally desirable in order to minimize ash problems. It has been found that polymerizations will occur when the catalyst level of the neodymium metal varies between 0.05 and 1.0 millimole of neodymium metal per 100 grams of monomer. A preferred ratio is between 0.1 and 0.3 millimole of neodymium metal per 100 grams of monomer. The concentration of the total catalyst system employed, of course, depends upon factors such as purity of the system, polymerization rate desired, temperature and other factors. Therefore, specific concentrations cannot be set forth except to say that catalytic amounts are used.

Temperatures at which the polymerization reaction is carried out can be varied over a wide range. Usually the temperature can be varied from extremely low temperatures such as −60° C. up to high temperatures, such as 150° C. or higher. Thus, the temperature is not a critical factor of the invention. It is generally preferred, however, to conduct the reaction at a temperature in the range of from about 10° C. to about 130° C. Typically, the polymerization will be conducted at a temperature which is within the range of 40° C. to 120° C. and will more typically be conducted at a temperature which is within the range of 60° C. to 110° C. In commercial production settings the polymerization temperature will normally be within the range of 85° C. to 105° C. The pressure at which the polymerization is carried out can also be varied over a wide range. The reaction can be conducted at atmospheric pressure or, if desired, it can be carried out at sub-atmospheric or super-atmospheric pressure. Generally, a satisfactory polymerization is obtained when the reaction is carried out at about autogenous pressure, developed by the reactants under the operating conditions used.

The polymerization can be terminated by the addition of an alcohol or another protic source, such as water. Such a termination step results in the formation of a protic acid. However, it has been unexpectedly found that better color can be attained by utilizing an alkaline aqueous neutralizer solution to terminate the polymerization. Another advantage of using an alkaline aqueous neutralizer solution to terminate the polymerization is that no residual organic materials are added to the polymeric product.

Polymerization can be terminated by simply adding an alkaline aqueous neutralizer solution to the polymer cement. The amount of alkaline aqueous neutralizer solution added will typically be within the range of about 1 weight percent to about 50 weight percent based upon the weight of the polyisoprene cement. More typically, the amount of the alkaline aqueous neutralizer solution added will be within the range of about 4 weight percent to about 35 weight percent based upon the weight of the polyisoprene cement. Preferably, the amount of the alkaline aqueous neutralizer solution added will be within the range of about 5 weight percent to about 15 weight percent based upon the weight of the polyisoprene cement.

The alkaline aqueous neutralizer solution will typically have a pH which is within the range of 7.1 to 9.5. The alkaline aqueous neutralizer solution will more typically have a pH which is within the range of 7.5 to 9.0, and will preferably have a pH that is within the range of 8.0 to 8.5. The alkaline aqueous neutralizer solution will generally be a solution of an inorganic base, such as a sodium carbonate, a potassium carbonate, a sodium bicarbonate, a potassium bicarbonate, a sodium phosphate, a potassium phosphate, and the like. For instance, the alkaline aqueous neutralizer solution can be a 0.25 weight percent solution of sodium bicarbonate in water. Since the alkaline aqueous neutralizer solution is not soluble with the polymer cement it is important to utilize a significant level of agitation to mix the alkaline aqueous neutralizer solution into throughout the polymer cement to terminate the polymerization. Since the alkaline aqueous neutralizer solution is not soluble in the polymer cement it will readily separate after agitation is discontinued.

This invention is illustrated by the following examples that are merely for the purpose of illustration and are not to be regarded as limiting the scope of the invention or the manner in which it can be practiced. Unless specifically indicated otherwise, parts and percentages are given by weight, polymer microstructures were determined by nuclear magnetic resonance spectrometry (NMR), glass transition temperatures (Tg) were determined by differential scanning calorimetry at a heating rate of 10° C. per minute, and molecular weights were determined by gel permeation chromatography (GPC).

Example 1

This example serves to demonstrate the random incorporation of 1,3-butadiene and isoprene into a copolymer using a preformed neodymium-aluminum catalyst in accordance with the method of this invention.

The preformed neodymium catalyst was prepared in a 1-gallon (3.785 liter) reactor by mixing 30 eq isoprene (15 weight percent in hexanes), 18 eq triisobutylaluminum (0.88M in hexanes), and 1 eq neodymium versatate (0.5 M in hexanes) at room temperature. After 30 minutes, 2.3 eq diethylaluminum chloride (1.47 M in hexanes) was added and with stirring being continued for an additional 60 minutes.

Polymerizations were performed in a 10-gallon (37.85 liter) reactor at a temperature of 65° C. A monomer premix containing 30 weight percent isoprene and 70 weight percent 1,3-butadiene (43 lbs, 11.0 weight percent monomers in hexanes) was charged into the reactor followed by addition of 102 mL (25 weight percent triisobuylaluminum in hexanes), and subsequently by addition of 92 mL of preformed neodymium-aluminum catalyst (0.028 M Nd in hexanes). Polymerization was terminated after 95% conversion was achieved by the addition 109 mL isopropanol solution (25 weight percent in hexane) and 122 mL Polystay® K antioxidant solution (12 weight percent in hexane) and then 21.4 mL water. During polymerization, conversion of both monomers was monitored for relative reaction rate. The conversion of both isoprene monomer and 1,3-butadiene monomer as a function of time is reported in Table 1.

The resulting polymer was characterized and found to have a Mooney viscosity (ML 1+4) at 100° C. of 74 MU, a number average molecular weight ($M_n$) of 328,000, and a weight average molecular weight ($M_w$) of 832,000, and a polydispersity (PDI) of 2.53.

TABLE 1

Butadiene and isoprene conversion as a function of time

| Reaction Time (minutes) | Butadiene Conversion | Isoprene Conversion |
|---|---|---|
| 0 | 0% | 0% |
| 10 | 45% | 47% |
| 20 | 63% | 65% |
| 30 | 74% | 76% |
| 60 | 91% | 94% |
| 90 | 98% | 99% |
| 120 | 99% | 99% |

Example 2

This experiment was conducted to synthesize a random isoprene-butadiene copolymer utilizing a higher level of isoprene and the same catalyst as is described in Example 1.

The same reaction conditions as were utilized in Example 1 were employed in this experiment. The monomer premix used contained 50 weight percent isoprene and 50 weight percent 1,3-butadiene (11.4 weight percent total monomer in hexanes). The polymerization was run with 43 lbs of the monomer premix, 89 grams of triisobutylaluminum (25 weight percent in hexanes), and 96 mL of a preformed neodymium-aluminum catalyst (0.028 M Nd in hexanes). Polymerization was run to greater than 90% conversion and then terminated with 113 mL isopropanol solution (25 weight percent in hexane), 126.7 mL Polystay® K antioxidant solution (12 weight percent in hexane), and then 22.2 mL water. During polymerization, conversion of both monomers was monitored to determine the relative reaction rates of the two monomers. The conversion of isoprene monomer and 1,3-butadiene monomer as a function of time is reported in Table 2.

The resulting polymer was characterized and found to have a Mooney viscosity (ML 1+4) at 100° C. of 56 MU, a number average molecular weight ($M_n$) of 288,000, a weight average molecular weight ($M_w$) of 1,023,000, and a polydispersity (PDI) of 3.55. The random isoprene-butadiene copolymer rubber made in this experiment was also determined to have the following microstructure content: 48.7% cis-1,4 PBd, 0.3% 1,2 PBd, 49.7% cis-1,4 PI, and 1.3% 3,4-PI.

TABLE 2

Butadiene and isoprene conversion as a function of time

| Reaction Time (minutes) | Butadiene Conversion | Isoprene Conversion |
|---|---|---|
| 0 | 0% | 0% |
| 10 | 40% | 39% |
| 20 | 55% | 55% |
| 30 | 64% | 64% |
| 60 | 80% | 81% |
| 90 | 90% | 91% |
| 120 | 95% | 96% |

Example 3

This example serves to demonstrate a random isoprene butadiene copolymer synthesized with a preformed neodymium catalyst made with butadiene present. The catalyst was made using a similar procedure to the catalyst above in Example 1 with the following ratios: 1.0 eq neodymium versatate, 25 eq triisobutylaluminum, 40 eq butadiene, 2.5 eq diethylaluminum chloride. Using the same reaction conditions as Example 1, now with the preformed Nd—Al catalyst prepared with butadiene, a polymerization was run with 30 lbs (13.6 kg) premix (12.6 weight percent total monomer, 30% isoprene and 70% 1,3-butadiene), 41.3 grams of triisobutylaluminum (25 weight percent in hexanes), and 67.4 mL of a preformed neodymium-aluminum catalyst (0.028 M Nd in hexanes). Polymerization was run to greater than 95% conversion and then terminated with 87.6 mL isopropanol solution (25 wt % in hexane), 98.0 mL Polystay® K antioxidant solution (12 weight percent in hexane), and then 1.7 L water. During polymerization, conversion of both monomers was monitored for relative reaction rate. The conversion of the isoprene monomer and the 1,3-butadiene monomer as a function of time is reported in Table 3.

The resulting polymer was characterized and found to have a Mooney viscosity (ML 1+4) at determined at 100° C. of 60 MU.

TABLE 3

Butadiene monomer and isoprene monomer conversion as a function of time

| Reaction Time (minutes) | Butadiene Conversion | Isoprene Conversion |
|---|---|---|
| 0 | 0% | 0% |
| 30 | 81% | 84% |

TABLE 3-continued

| Butadiene monomer and isoprene monomer conversion as a function of time | | |
|---|---|---|
| Reaction Time (minutes) | Butadiene Conversion | Isoprene Conversion |
| 60 | 94% | 96% |
| 90 | 98% | 100% |

Example 4

This example serves to demonstrate that previous attempts to make a random isoprene-butadiene copolymer with a preformed neodymium catalyst, such as in U.S. Pat. No. 5,405,815, do not produce as random of polymer as the current invention.

A preformed neodymium catalyst was made in a 1-gallon reactor at 25° C. by charging 327 grams butadiene premix (12 weight percent butadiene in hexanes), 343 grams diisobutyl aluminum hydride solution (25 wt % in hexanes), 70.55 g neodymium versatate solution (0.5 M in hexanes), and 310 grams hexane while mixing. This mixture was mixed for a total of 15 minutes. Further, 7.46 mL allyl bromide was added followed by 3 mL hexanes. This mixture was stirred for 60 minutes at a temperature of 25° C. followed by 90 minutes at 65° C.

A polymerization was run with 43 lbs (19.5 kg) premix (11.0 weight percent total monomer, 30% isoprene 70% butadiene), 11.8 g diisobutylaluminum hydride (25 weight percent in hexanes), and 99.4 mL of a preformed neodymium-aluminum catalyst (0.028 M Nd in hexanes). Polymerization was run to greater than 90% conversion and then terminated with 109 mL isopropanol solution (25 weight percent in hexane), 122 mL Polystay® K antioxidant solution (12 weight percent in hexane), and then 21.4 mL water. During polymerization, conversion of both monomers was monitored for relative reaction rate. The conversion of both the isoprene monomer and the 1,3-butadiene monomer as a function of time are reported in Table 4.

The resulting polymer was characterized and found to have a Mooney viscosity (ML 1+4) as measured at 100° C. of 75 MU, a weight average molecular weight ($M_n$) of=330, 000, a weight average molecular weight ($M_w$) of 731,000, and a polydispersity (PDI) of 2.22.

TABLE 4

| Butadiene and isoprene conversion as a function of time | | |
|---|---|---|
| Reaction Time (minutes) | Butadiene Conversion | Isoprene Conversion |
| 0 | 0% | 0% |
| 10 | 15.9% | 11.4% |
| 20 | 25.2% | 16.7% |
| 30 | 35.8% | 23.5% |
| 60 | 55.9% | 39.2% |
| 120 | 79.9% | 62.6% |
| 180 | 89.2% | 74.7% |
| 240 | 94.4% | 83.1% |
| 300 | 96.5% | 87.5% |

While certain representative embodiments and details have been shown for the purpose of illustrating the subject invention, it will be apparent to those skilled in this art that various changes and modifications can be made therein without departing from the scope of the subject invention.

What is claimed is:

1. A process for the synthesis of an isoprene-butadiene rubber which comprises copolymerizing (a) isoprene monomer or a substituted isoprene monomer and (b) 1,3-butadiene monomer in the presence of a neodymium catalyst system, wherein the neodymium catalyst system is prepared by (1) reacting a neodymium carboxylate with an organoaluminum compound in the presence of a conjugated diolefin monomer to produce neodymium-aluminum catalyst component, and (2) subsequently reacting the neodymium-aluminum catalyst component with an alkyl aluminum chloride to produce the neodymium catalyst system, where from 40 weight percent to 70 weight percent isoprene is copolymerized with 30 weight percent to 60 weight percent 1,3-butadiene.

2. The process as specified in claim 1 wherein the neodymium catalyst is prepared at a temperature that is within the range of about −60° C. to about 150° C.

3. The process as specified in claim 2 wherein the mole ratio of the organoaluminum compound to the neodymium carboxylate is within the range of about 4/1 to about 200/1.

4. The process as specified in claim 2 wherein the organoaluminum compound is selected from the group consisting of trialkylaluminum compounds and dialkylaluminum hydride compounds.

5. The process as specified in claim 4 wherein the mole ratio of the organoaluminum compound to the neodymium carboxylate is within the range of about 10/1 to about 50/1.

6. The process as specified in claim 2 wherein the polymerization is carried out at a temperature within the range of about 10° C. to about 130° C. in an organic solvent.

7. The process as specified in claim 2 wherein said organoaluminum compound is selected from the group consisting of diethylaluminum hydride, di-n-propylaluminum hydride, di-n-butylaluminum hydride, diisobutylaluminum hydride, diphenylaluminum hydride, di-p-tolylaluminum hydride, dibenzylaluminum hydride, phenylethylaluminum hydride, phenyl-n-propylaluminum hydride, p-tolyethylalumin hydride, p-tolyl-n-propylaluminum hydride, p-tolylisopropylaluminum hydride, benzylethylaluminum hydride, benzyl-n-propylaluminum hydride, benzylisopropylaluminum hydride, ethylaluminum dihydride, butylaluminum dihydride, isobutylaluminum dihydride, octylaluminum dihydride, amylaluminum dihydride, trimethylaluminum, triethylaluminum, tri-n-propylaluminum, triisopropylaluminum, tri-n-propylaluminum, triisopropylaluminum, tri-n-butylaluminum, triisobutylaluminum, tripentylaluminum, trihexylaluminum, trioctylaluminum, triphenylaluminum, tri-p-tolyaluminum, tribenylaluminum, ethyldiphenylaluminum, ethyl-di-p-tolylaluminum, ethyldibenzylaluminum, diethylphenylaluminum, diethyl-p-tolylaluminum, and diethylbenzylaluminum.

8. The process as specified in claim 7 wherein the alkyl aluminum chloride is a dialkyl aluminum chloride, and wherein the dialkyl aluminum chloride is selected from the group consisting of dimethyl aluminum chloride, diethylaluminum chloride, dipropylaluminum chloride, dihexylaluminum chloride, diisobutylaluminum chloride, and didodecyaluminum chloride.

9. The process as specified in claim 1 wherein the polymerization is terminated by the addition of an alkaline aqueous neutralizer solution, wherein the alkaline aqueous neutralizer solution has a pH within the range of 7.1 to 9.5.

10. The process as specified in claim 9 wherein the alkaline aqueous neutralizer solution is an aqueous solution of sodium bicarbonate.

11. The process as specified in claim 9 wherein the alkaline aqueous neutralizer solution has a pH within the range of 7.5 to 9.0.

12. The process as specified in claim 9 wherein the alkaline aqueous neutralizer solution has a pH within the range of 8.0 to 8.5.

13. The process as specified in claim 1 where from 45 weight percent to 70 weight percent isoprene is copolymerized with 30 weight percent to 55 weight percent 1,3-butadiene.

14. The process as specified in claim 1 where from 50 weight percent to 70 weight percent isoprene is copolymerized with 30 weight percent to 50 weight percent 1,3-butadiene.

15. The process as specified in claim 1 where from 55 weight percent to 70 weight percent isoprene is copolymerized with 30 weight percent to 45 weight percent 1,3-butadiene.

16. The process as specified in claim 1 where from 60 weight percent to 70 weight percent isoprene is copolymerized with 30 weight percent to 40 weight percent 1,3-butadiene.

17. The process as specified in claim 3 wherein the neodymium catalyst is prepared at a temperature which is within the range of about 5° C. to about 15° C.

18. The process as specified in claim 3 wherein the molar ratio of the dialkyl aluminum chloride to neodymium is within the range of about 0.5:1 to about 3.5:1.

19. A process for the synthesis of an isoprene-butadiene rubber which comprises copolymerizing (a) isoprene monomer or a substituted isoprene monomer and (b) 1,3-butadiene monomer in the presence of a neodymium catalyst system, wherein the neodymium catalyst system is prepared at a temperature that is within the range of about −60° C. to about 150° C. by (1) reacting a neodymium carboxylate with an organoaluminum compound in the presence of a conjugated diolefin monomer to produce neodymium-aluminum catalyst component, wherein the organoaluminum compound is selected from the group consisting of trialkylaluminum compounds and dialkylaluminum hydride compounds, and (2) subsequently reacting the neodymium-aluminum catalyst component with an alkyl aluminum chloride to produce the neodymium catalyst system, where from 40 weight percent to 70 weight percent isoprene is copolymerized with 30 weight percent to 60 weight percent 1,3-butadiene and the molar ratio of isoprene monomer to neodymium ranges from about 5/1 to about 500/1.

20. The process as specified in claim 19 wherein the neodymium carboxylate is selected from the group consisting of neodymium octoate, neodymium neodecanoate, and neodymium 2-ethyl hexanoate.

* * * * *